United States Patent
Chae

(10) Patent No.: US 7,640,012 B2
(45) Date of Patent: Dec. 29, 2009

(54) CONTROLLING THE COMMUNICATION MODE IN A MOBILE COMMUNICATION TERMINAL

(75) Inventor: Hong-Chul Chae, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 325 days.

(21) Appl. No.: 11/531,608

(22) Filed: Sep. 13, 2006

(65) Prior Publication Data

US 2007/0058580 A1    Mar. 15, 2007

(30) Foreign Application Priority Data

Sep. 14, 2005    (KR) .................... 10-2005-0085940

(51) Int. Cl.
*H04M 3/00*    (2006.01)
*H04M 1/00*    (2006.01)
*H04W 4/00*    (2009.01)

(52) U.S. Cl. .................... 455/418; 455/567; 455/434
(58) Field of Classification Search .................. 455/418
See application file for complete search history.

(56) References Cited

U.S. PATENT DOCUMENTS

| | | | | |
|---|---|---|---|---|
| 5,369,798 | A * | 11/1994 | Lee ............................. | 455/434 |
| 6,594,498 | B1 * | 7/2003 | McKenna et al. ........... | 455/517 |
| 6,819,079 | B2 * | 11/2004 | Karapetyan et al. ......... | 320/102 |
| 6,907,254 | B1 * | 6/2005 | Westfield .................. | 455/456.4 |
| 6,928,300 | B1 * | 8/2005 | Skinner et al. ........... | 455/556.2 |
| 7,356,351 | B1 * | 4/2008 | Shah ........................ | 455/556.1 |
| 2002/0052225 | A1 * | 5/2002 | Davis et al. ................. | 455/567 |
| 2004/0127197 | A1 * | 7/2004 | Roskind .................. | 455/412.2 |
| 2004/0203667 | A1 * | 10/2004 | Schroeder et al. ........ | 455/414.1 |
| 2004/0242239 | A1 * | 12/2004 | Hertz ...................... | 455/456.3 |
| 2005/0246098 | A1 * | 11/2005 | Bergstrom et al. .......... | 701/213 |

FOREIGN PATENT DOCUMENTS

| | | |
|---|---|---|
| JP | 10-242901 | 9/1998 |
| JP | 2000-040970 | 2/2000 |
| JP | 2001-086566 | 3/2001 |
| JP | 2001-224075 | 8/2001 |
| JP | 2004-193867 | 7/2004 |
| KR | 10-2002-0057209 A | 7/2002 |
| KR | 10-2002-0066237 A | 8/2002 |
| KR | 10-2004-0021958 A | 3/2004 |

* cited by examiner

*Primary Examiner*—Lester Kincaid
*Assistant Examiner*—Yu (Andy) Gu
(74) *Attorney, Agent, or Firm*—Lee, Hong, Degerman, Kang & Waimey

(57) ABSTRACT

A mobile communication terminal comprising an interface for allowing scheduling of a first time period; a timer for monitoring a beginning and an end for the first time period; and a controller for switching the mobile communication terminal to a first mode, at the beginning of the first time period, and for switching the mobile communication terminal to a second mode at the end of the first time period, wherein in the first mode, the mobile communication terminal cannot communicate over a mobile communication network.

27 Claims, 3 Drawing Sheets

CONTROLLING THE COMMUNICATION MODE IN A MOBILE COMMUNICATION TERMINAL

CROSS-REFERENCE TO RELATED APPLICATION

Pursuant to 35 U.S.C. § 119(a), this application claims the benefit of earlier filing date and right of priority to Korean Patent Application No. 10-2005-0085940, filed on Sep. 14, 2005, the contents of which is hereby incorporated by reference herein in its entirety.

FIELD OF THE INVENTION

The present invention relates to a mobile communication terminal, and particularly, to a mobile communication terminal that can be deactivated and reactivated based on user preference.

BACKGROUND

Mobile communication terminals such as mobile phones, personal digital Assistants (PDAs) and the like are very popular and useful. FIG. 1 illustrates a mobile communication environment where various channels are used to establish communication between a mobile terminal and a base station. The etiquette related to using mobile terminals is now becoming important. For example, using a mobile communication terminal in certain zones (e.g., hospitals, inside of airplanes, concert halls, etc.) is considered improper.

Patent Publication No. 1999-0084203, 2001-0075024 presents a method and apparatus for forcibly cutting off transmission/reception waves of a mobile communication terminal in a particular area. Patent Publication No. 2000-0072355 is related to preventing noise caused by ring-tones, and describes an apparatus for automatically converting a sound of the mobile communication terminal into a vibration mode or a visual alert mode.

The above implementations require an additional apparatus or software to be separately installed within the repeater Accordingly, in zones (e.g., airports, airplanes, hospitals, and the like) in which such additional apparatuses are difficult to install, a user of the mobile communication terminal has to turn his terminal off by himself. When the user gets out of the zones where the using of the mobile communication terminal is not permitted, the user has to remember to turn the mobile communication terminal back on.

If the user forgets to turn his mobile communication terminal back on, the call reception will not be reinstated automatically. Furthermore, when the user turns off his mobile communication terminal, other functions of his mobile communication terminal such as camera, games, etc. will be also inaccessible. Method and systems are needed to overcome the above shortcomings.

SUMMARY

In accordance with one aspect of the invention, a method for controlling a communication mode of a mobile communication terminal is provided. The method comprises receiving a deactivation time for deactivating the communication mode of the mobile communication terminal; receiving a reactivation time for reactivating the communication mode; and deactivating the communication mode, in response to detecting the deactivation time, wherein a user can use features of the mobile communication terminal that are unrelated to the communication mode, when the communication mode is deactivated.

The method may further comprise reactivating the communication mode, in response to detecting the reactivation time. When the communication mode is deactivated, the mobile communication terminal cannot communicate over a mobile communication network. in one embodiment, the reactivation of the communication mode is delayed, where mobile communication service is unavailable. The mobile communication terminal is configured to determine whether the mobile communication service is available by scanning a predetermined communication channel.

In one embodiment, the predetermined communication channel is at least one of a pilot channel and a synchronization channel, for example, in a CDMA based mobile communication network. When the communication mode is deactivated, the mobile communication terminal cannot be used for voice or data communication. In one embodiment, at least one of the reactivation time and the deactivation time can be updated.

In accordance with another embodiment, a method of controlling a communication mode of a mobile communication terminal comprises scheduling a first time period during which the mobile communication terminal switches to a first mode, wherein in the first mode the mobile communication terminal cannot communicate over a mobile communication network, and wherein in the first mode, the non-communication related features of the mobile communication terminal remain available to a user.

In one embodiment, after the first time period expires the mobile communication terminal switches to a second mode from the first mode, wherein in the second mode the mobile communication terminal can communicate over the mobile communication network. After the first time period expires, the mobile communication terminal remains in the first mode until the mobile communication terminal detects that mobile communication service is available.

In accordance with yet another aspect of the invention, a mobile communication terminal comprises an interface for allowing scheduling of a first time period; a timer for monitoring a beginning and an end for the first time period; and a controller for switching the mobile communication terminal to a first mode, at the beginning of the first time period, and for switching the mobile communication terminal to a second mode at the end of the first time period, wherein in the first mode, the mobile communication terminal cannot communicate over a mobile communication network.

In one embodiment, the controller comprises first and second controllers, wherein the first controller controls at least one of a receiver and a transmitter of the mobile communication terminal, such that at least one of the receiver and the transmitter is deactivated in the first mode. The controller further comprises a third controller for determining whether the mobile communication terminal is in a service area, and for maintaining at least one of the receiver and the transmitter in deactivated state when the mobile communication terminal switches to the second state, if at the end of the first time period the mobile communication terminal is not in a service area.

In the second mode, the mobile communication terminal can communicate over a mobile communication network. In the first mode, the non-communication related features of the mobile communication terminal are usable. At the end of the first time period, the mobile communication terminal remains in the first mode until the mobile communication terminal detects that mobile communication service is available. The mobile communication terminal is configured to determine whether the mobile communication service is available by scanning a predetermined communication channel. The predetermined communication channel can be at least one of a pilot channel and a synchronization channel in, for example, a CDMA based mobile communication network.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention, are incorporated in and constitute a part of this specification, illustrate embodiments of the invention and together with the description serve to explain the principles of the invention.

Reference will now be made in detail to the preferred embodiments of the present invention, examples of which are illustrated in the accompanying drawings.

DETAILED DESCRIPTION OF THE PREFERRED EMBODIMENTS

Figure 2:
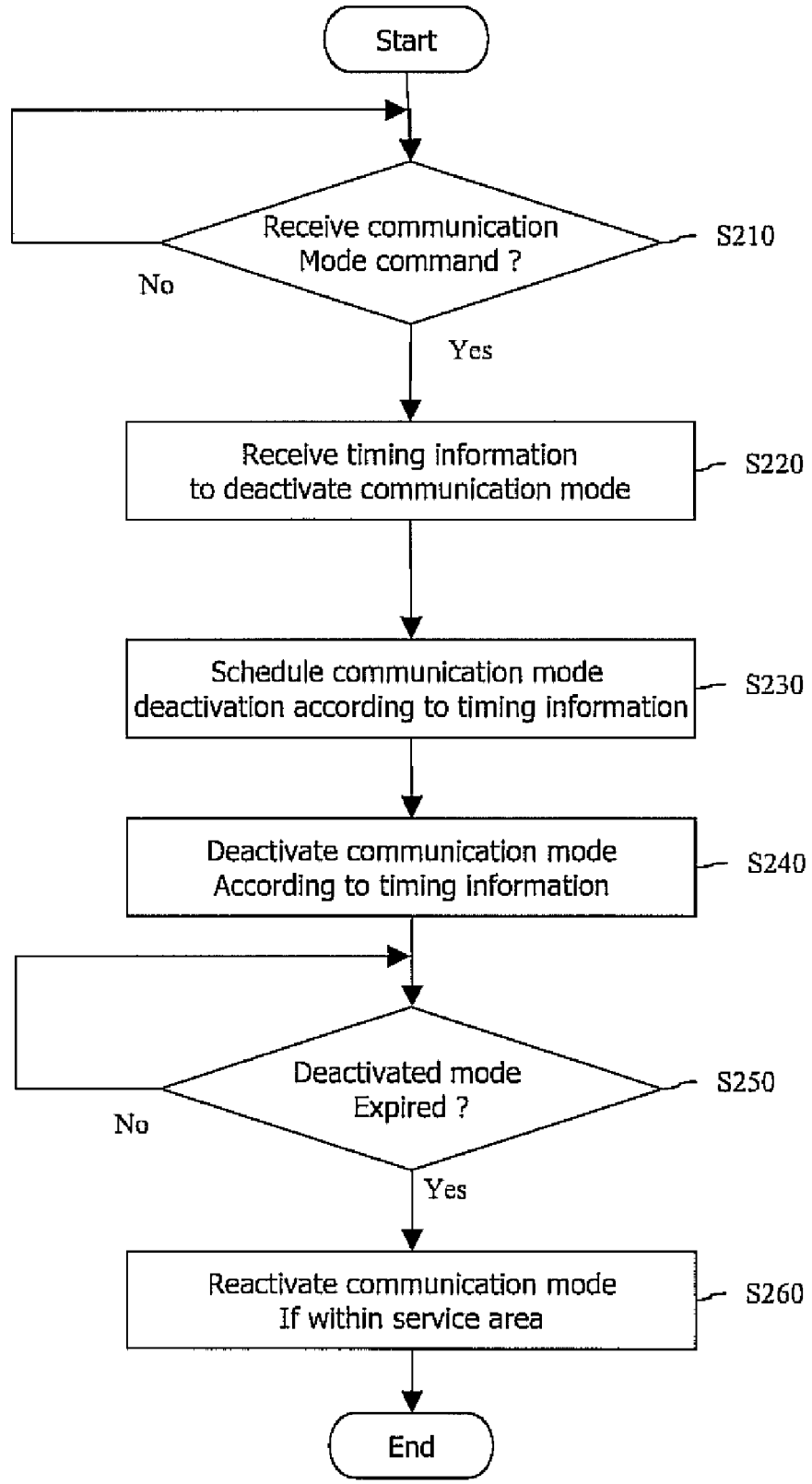
FIG. 2 is a flowchart illustrating a method for switching a transmission/reception mode in accordance with one embodiment.

Referring to FIG. 2, a method for activating and deactivating the communication mode of a mobile terminal is provided. In accordance with one aspect of the invention, a user of a mobile terminal can interact with a user interface of the mobile terminal to control a communication mode of the mobile terminal.

The communication mode of the mobile terminal refers to a state in which a transceiver of the mobile terminal is activated, so that the mobile terminal can transmit or receive voice or data over communication channels in the mobile communication network. It is noteworthy that the communication mode of the mobile terminal is preferably independent from other functional aspects of the mobile terminal. That is, when the communication mode is deactivated, the mobile terminal's power remains on, such that a user of the mobile terminal can use the mobile terminal for non-communication related functions (e.g., game function, audio/visual music function, calendar function, etc.).

Referring back to FIG. 2, in one embodiment, a controller of the mobile communication terminal is configured to determine whether a communication mode command is received (S210). Preferably, a communication mode command is received, in response to a user of the mobile terminal interacting with the mobile terminal to activate or deactivate a communication mode.

For example, a user may select from a graphical menu or press a key on the mobile terminal's user interface to select an option for deactivating the communication mode. Depending on implementation, when the communication mode is deactivated, the mobile terminal can no longer receive communication data (e.g., voice calls, short messages, etc.), or can no longer transmit communication data, or both.

In some embodiments, in response to user interaction, the mobile terminal will receive timing information to deactivate the communication mode (S220). The user, for example, can identify one or more timelines when the communication mode should be active or inactive. For example, a user may input data for the mobile terminal's communication mode to be deactivated between the hours of 11 pm and 7 am when he goes to sleep. Other possible options may be for the communication mode to be deactivated anytime the user sets a meeting in his calendar. Other possible deactivation or activation periods can be defined depending on implementation.

In a preferred embodiment, the mobile terminal schedules to deactivate the mobile terminal's communication mode according to the received timing information (S230). When the scheduled time arrives, the mobile terminal deactivates the communication mode according to the timing information (S240). The deactivation of the communication mode may cause for the transceiver of the mobile terminal to be turned off or for the transceiver to enter a sleep mode.

In the deactivated mode, the mobile terminal does not search the communication channels to determine if any communication data is being transmitted to the mobile terminal. In this period, for example, any voice or data communication directed to the mobile terminal may be stored in a database external to the mobile terminal for future retrieval or delivery. For example, a voice call received when the mobile terminal's communication mode is deactivated will be saved in a voice mail database. Similarly, a text message may be stored in a text message database and delivered when the mobile terminal's communication mode is reactivated.

In an alternative embodiment, the receiver of the mobile terminal may not be deactivated. In such embodiment, a voice or data call received by the receiver may be stored in an internal database of the mobile terminal without alerting the user of the receipt of the incoming communication. In some embodiments, in the deactivated mode, the user cannot initiate any communication either In other embodiments, the user may be able to initiate communication to certain destinations (e.g., family or emergency 911 call), but not all destinations when in deactivated mode.

The mobile terminal stays in the deactivated mode until the deactivated mode expires (S250). Once the deactivated mode expires, the mobile terminal reactivates the communication mode (S260). As provided in further detail below, in certain embodiments, even after the allotted time threshold has expired, the mobile terminal may stay in a deactivated state, if it is determined that the mobile terminal is not in a viable service area to send or receive communication. This will avoid undue use of the mobile terminal's battery.

In certain embodiments, prior to the communication mode being reactivated, the user is prompted to confirm or deny reactivation of the communication mode. In other embodiments, the communication mode is automatically reactivated when the time expires. Thus, advantageously, the user will not have to remember to manually reactivate the communication mode.

In one embodiment, when the communication mode is deactivated, the user can enter a special code or select from an option menu to manually reactivate the communication mode, prior to the expiration of the deactivation time. In some embodiments, the user can temporarily reactivate the communication mode so that the communication mode remains active and is then deactivated again.

In accordance with one embodiment, the user can select to activate or deactivate communication mode for various communication features. For example, the user may deactivate the communication mode for incoming voice calls but configure the mobile terminal to receive data communication other than voice calls (e.g., SMS, MMS, stock quotes, etc.).

Figure 1:
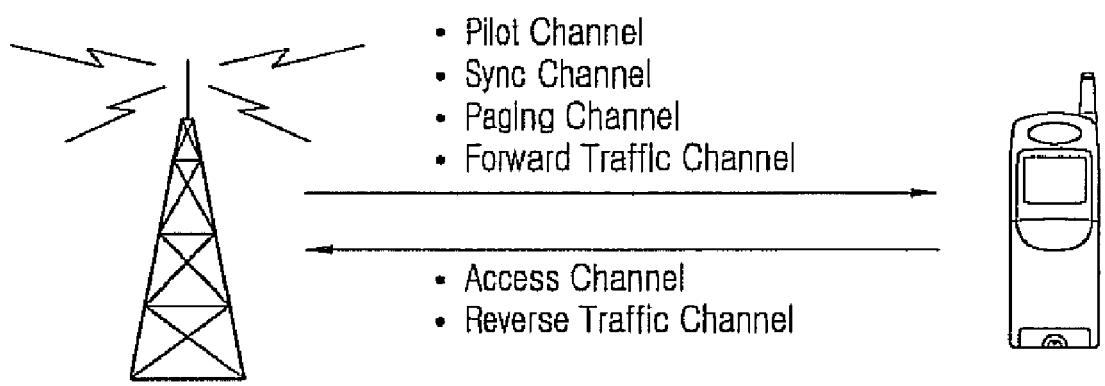
FIG. 1 is a diagram illustrating a mobile communication environment where various channels are used to establish communication between a mobile terminal and a base station.

According to one embodiment, and referring to FIG. 1, an exemplary communication network (e.g., CDMA) uses a pilot channel, a synchronous channel, a paging channel, and a forward traffic channel in a forward direction, while using an access channel and a reverse traffic channel in a reverse direction. The pilot channel is used to synchronize a short PN (pseudo noise) code of a terminal with that of a base station. The synchronous channel is used to transfer a short PN code offset and information related to a timing for receiving and transmitting messages.

The paging channel is used to transfer information related to the base station and a system environment and calling messages. The access channel is used to transmit originating messages and registering messages from the terminal to the base station. The forward and reverse traffic channels are used to transmit and receive actual voice (audio) signals.

Accordingly, in an exemplary embodiment, the synchronous channel and the paging channel are monitored, and the monitored result can be used to determine whether a service can be provided. If service becomes available, a visual, audio, olfactory, or tactile alert can be provided to the user to indicate that the mobile terminal's communication mode will be reactivated.

The present invention, as described so far, may be implemented in software, hardware, or a combination of the two. For example, the method for switching the transmission/reception mode according to the present invention can be stored in storage media such as an internal memory of the mobile communication terminal, a flash memory, a hard disk, and the like, and also can be implemented as codes or command words within a software program which can be executed by a processor (e.g., a microprocessor disposed within the mobile communication terminal).

Figure 3:
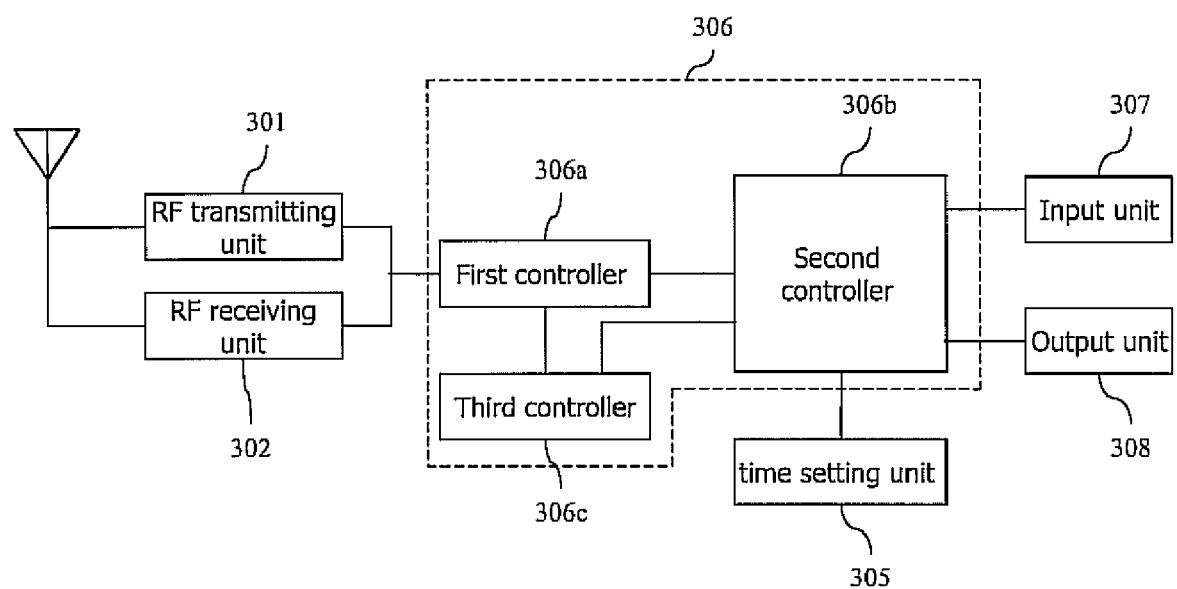
FIG. 3 is a block diagram illustrating the internal components of a mobile communication terminal in accordance with an exemplary embodiment.

Referring to FIG. 3, a mobile terminal according to one embodiment of the present invention may comprise RF transmitting and receiving units 301, 302, a time setting unit 305, a controller 306, and input output units 307, 308.

Preferably, the controller 306 can control the RF signal by being connected to transmitting and receiving units 301 and 302 of the mobile communication terminal. The time setting unit 305 is provided to set a time for reactivating the mobile terminal according to time information inputted by the user or received from a base station.

In accordance with one embodiment, the time setting unit 305 can be constructed as a timer. The controller 306 may comprise first, second and third controllers 306a, 306b and 306c, respectively. First controller 306a is preferably connected to second controller 306b connected to the time setting unit 305 to control activation or deactivation of the communication mode as provided above.

The second controller 306b can also be connected to input and output units 307 and 308 of the mobile communication terminal to receive timing information from a user and to provide various information related to the deactivation of the communication mode to the user. In one embodiment, the second controller 306b can display the elapsed time for deactivation or the time remaining until the communication mode is reactivated.

The output unit 308 of the mobile communication terminal can be used to notify the user of the elapsed time or the time remaining before the mobile terminal is reactivated by way of, for example, an audio/visual, tactile or olfactory alert signal. In accordance with another embodiment, the third controller 306c detects whether a mobile communication service is available.

For example, the third controller 306c may be connected to the second controller 306b and/or the first controller 306a. If the third controller 306c is connected to both the second and first controllers, the second controller 306b can controls the third controller 306c, and the third controller 306c then controls the first controller 306a to thus monitor whether service can be used. Accordingly, the third controller 306c can transfer the monitored result to the second controller 306b.

When the third controller 306c is connected to the second controller 306b, the third controller 306c receives information from the second controller 306b, the information being transferred from the first controller 306a to the second controller 306b. The third controller 306c then transfers the monitored result to the second controller 306b.

Accordingly, in one embodiment, the communication mode can be automatically or manually reactivated. In one embodiment, if the third controller 306c does not detect service in the area where the mobile terminal is located, the second controller 306b can turn off the power of the mobile communication terminal to conserve battery power, until service becomes available.

The components of the present invention such as the controller 306, and the time setting unit can be implemented in form of hardware, software or a combination of the two. The operational data and software can be stored in storage media such as an internal memory of the mobile terminal, a flash memory, a hard disk. As such, the present invention can comprise a medium in which the components are implemented as software executable by a processor.

As described above, certain functions of the mobile terminal can be used even in a state where communication mode is deactivated. The deactivation mode can be automatically or manually reactivated as scheduled by the user. The elapsed and remaining time for reactivation can be displayed or periodically provided to the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore all changes and modifications that fall within the metes and bounds of the claims, or equivalence of such metes and bounds are intended to be embraced by the appended claims.

What is claimed is:

1. A method for controlling a communication mode of a mobile communication terminal, the method comprising:
   receiving a deactivation time for deactivating the communication mode of the mobile communication terminal, wherein the mobile communication terminal can be configured to be used for data communication, but not used for voice communication when the communication mode is deactivated while the mobile communication terminal can be used for voice communication to at least one designated contact even when the communication mode is deactivated;
   receiving a reactivation time for reactivating the communication mode;
   deactivating the communication mode upon reaching the deactivation time;
   displaying time remaining until the reactivation time;
   prompting to confirm or deny reactivation of the communication mode upon reaching the reactivation time;

determining whether a mobile communication service is available by scanning a communication channel responsive to an input confirming the reactivation of the communication mode;

reactivating the communication mode upon the reaching the reactivation time and determining that the mobile communication service is available; and delaying the reactivation of the communication mode when mobile communication service is unavailable or the reactivation of the communication mode is denied, wherein features of the mobile communication terminal that are unrelated to the communication mode are usable when the communication mode is deactivated, the features that are unrelated to the communication mode comprising at least one of a game function and a multimedia function.

2. The method of claim 1, wherein when the communication mode is deactivated, the mobile communication terminal cannot communicate over a mobile communication network.

3. The method of claim 1, wherein the communication channel is at least one of a pilot channel and a synchronization channel in a CDMA based mobile communication network.

4. The method of claim 1, wherein the mobile communication terminal can be used for data communication when the communication mode is deactivated.

5. The method of claim 1, wherein at least one of the reactivation time and the deactivation time can be updated.

6. A method of controlling a communication mode of a mobile communication terminal, the method comprising:

scheduling a first time period during which the mobile communication terminal switches to a first mode;

determining whether a mobile communication service is available by scanning a communication channel after the first time period expires;

switching from the first mode to a second mode upon expiration of the first time period and determining that the mobile communication service is available; and remaining in the first mode until the mobile communication terminal detects that the mobile communication service is available after the first time period expires, wherein the mobile communication terminal can partially communicate over a mobile communication network and non-communication related features of the mobile communication terminal remain available to a user in the first mode, the non-communication related features comprising at least one of a game function and a multimedia function, and the mobile communication terminal can communicate over the mobile communication network in the second mode, wherein communication to at least one designated contact can be initiated by a user of the mobile communication terminal even in the first mode in which communication to non-designated contacts is blocked.

7. A mobile communication terminal comprising:

an interface configured to receive an input for scheduling a first time period;

a timer configured to monitor a beginning and an end of the first time period; and a controller configured to:

switch the mobile communication terminal to a first mode at the beginning of the first time period;

prompt to confirm or deny switching to a second mode at the end of the first time period;

determine whether the mobile communication terminal is in a service area by scanning a communication channel responsive to an input confirming the switching to the second mode;

switch the mobile communication terminal to the second mode at the end of the first time period upon determining that the mobile communication terminal is in the service area; and delay switching to the second mode when mobile communication terminal is not in the service area or the switching to the second mode is denied, wherein the mobile communication terminal cannot communicate over a mobile communication network and non-communication related features of the mobile communication terminal are usable in the first mode, the non-communication related features comprising at least one of a game function and a multimedia function.

8. The mobile communication terminal of claim 7, wherein the controller comprises first and second controllers, the first controller controlling at least one of a receiver and a transmitter of the mobile communication terminal such that the at least one of the receiver and the transmitter is deactivated in the first mode.

9. The mobile communication terminal of claim 8, wherein the controller further comprises a third controller configured to determine whether the mobile communication terminal is in the service area, and to maintain the at least one of the receiver and the transmitter in a deactivated state when the mobile communication terminal switches to the second mode if the mobile communication terminal is not in the service area at the end of the first time period.

10. The mobile communication terminal of claim 7, wherein the mobile communication terminal can communicate over the mobile communication network in the second mode.

11. The mobile communication terminal of claim 7, wherein the mobile communication terminal remains in the first mode until the mobile communication terminal detects that a mobile communication service is available in the service area at the end of the first time period.

12. The mobile communication terminal of claim 7, wherein the communication channel is at least one of a pilot channel and a synchronization channel in a CDMA based mobile communication network.

13. A system for controlling a communication mode of a mobile communication terminal, the system comprising:

a logic unit configured to receive a deactivation time for deactivating the communication mode of the mobile communication terminal, wherein the mobile communication terminal can be configured to be used for data communication, but not used for voice communication when the communication mode is deactivated;

a logic unit configured to receive a reactivation time for reactivating the communication mode; and a logic unit configured to deactivate the communication mode upon reaching the deactivation time;

a logic unit configured to prompt to confirm or deny reactivation of the communication mode upon reaching the reactivation time;

a logic unit configured to determine whether a mobile communication service is available by scanning a communication channel responsive to an input confirming the reactivation of the communication mode;

a logic unit configured to reactivate the communication mode upon the reaching the reactivation time and determine that the mobile communication service is available, wherein features of the mobile communication terminal that are unrelated to the communication mode are usable when the communication mode is deactivated, the features that are unrelated to the communication mode comprising at least one of a game function and a multimedia function.

14. The system of claim 13, wherein when the communication mode is deactivated, the mobile communication terminal cannot communicate over a mobile communication network.

15. The system of claim 13, wherein the communication channel is at least one of a pilot channel and a synchronization channel in a CDMA based mobile communication network.

16. The system of claim 13, wherein the mobile communication terminal cannot be used for voice communication when the communication mode is deactivated.

17. The system of claim 13, wherein the mobile communication terminal can be used for data communication when the communication mode is deactivated.

18. The system of claim 13, wherein at least one of the reactivation time and the deactivation time can be updated.

19. The method of claim 1, wherein the data communication comprises at least one of short message service (SMS) or multimedia messaging service (MMS).

20. The method of claim 1, further comprising:
displaying elapsed time after deactivating the communication mode.

21. The method of claim 1, wherein the deactivated communication mode can be manually reactivated prior to the reactivation time responsive to a special code received from a user of the mobile communication terminal.

22. The method of claim 6, further comprising:
displaying elapsed time of the first time period during the first mode.

23. The method of claim 6, further comprising:
displaying time remaining until the expiration of the first time period.

24. The method of claim 6, wherein the mobile communication mode can be manually switched to the second mode prior to the expiration of the first time period responsive to a special code received from a user of the mobile communication terminal.

25. The mobile communication terminal of claim 7, further comprising:
a display configured to display elapsed time of the first time period or time remaining until the end of the first time period during the first mode.

26. The mobile communication terminal of claim 7, wherein the controller is further configured to switch to the second mode before the end of the first time period responsive to a special code received from a user of the mobile communication terminal.

27. The mobile communication terminal of claim 7, wherein communication to at least one designated contact can be initiated by a user of the mobile communication terminal even in the first mode in which communication to non-designated contacts is blocked.

* * * * *